No. 616,785. Patented Dec. 27, 1898.
H. J. GRIMM.
BALING PRESS.
(Application filed Mar. 7, 1898.)
(No Model.) 2 Sheets—Sheet 1.
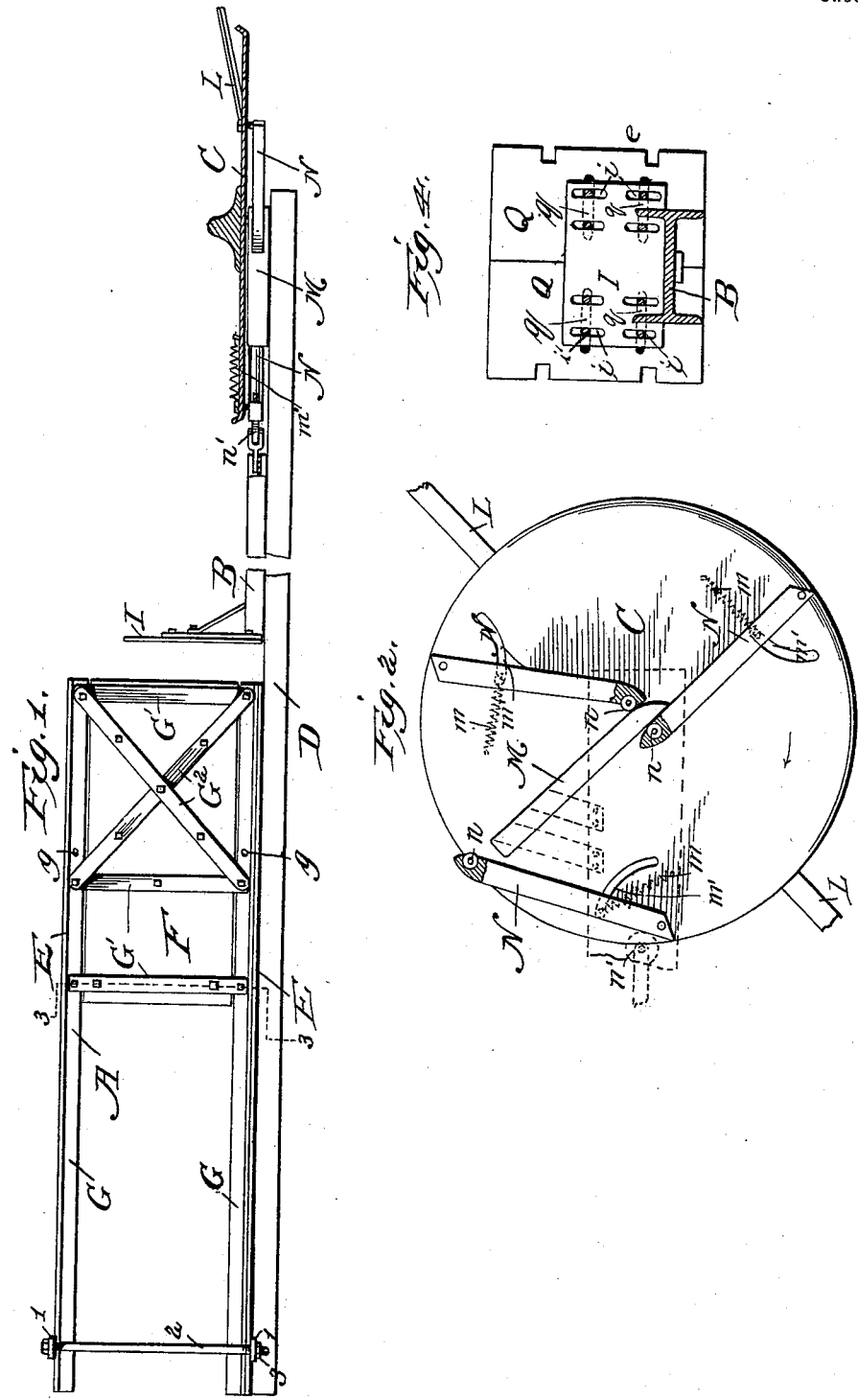
Attest
Traller Donaldson
James M Spear
Inventor
Henry J. Grimm
by Ellis Spear, Atty.

No. 616,785. Patented Dec. 27, 1898.
H. J. GRIMM.
BALING PRESS.
(Application filed Mar. 7, 1898.)

(No Model.) 2 Sheets—Sheet 2.

Attest
Walter Donaldson
F. L. Middleton

Inventor
Henry J. Grimm
by Ellis Spear
Atty.

THE NORRIS PETERS CO., PHOTO-LITHO., WASHINGTON, D. C.

UNITED STATES PATENT OFFICE.

HENRY J. GRIMM, OF QUINCY, ILLINOIS, ASSIGNOR OF ONE-HALF TO WILLIAM T. GRIMM, OF SAME PLACE.

BALING-PRESS.

SPECIFICATION forming part of Letters Patent No. 616,785, dated December 27, 1898.

Application filed March 7, 1898. Serial No. 672,887. (No model.)

*To all whom it may concern:*

Be it known that I, HENRY J. GRIMM, a citizen of the United States, residing at Quincy, county of Adams, and State of Illinois, have invented certain new and useful Improvements in Baling-Presses, of which the following is a specification.

My invention relates to improvements in presses for baling hay and other substances; and the objects of the invention are, first, to provide a press in which the baling-box shall be adjustable to form bales of varying sizes, and, secondly, to provide an improved, simple, and effective means of operating the plunger.

The invention is illustrated in the accompanying drawings, in which—

Figure 3:
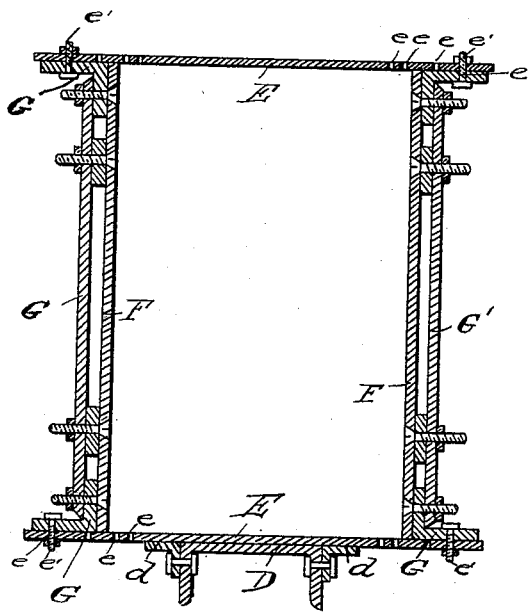
Figure 5:
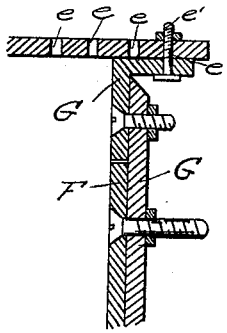

Figure 1 is a side elevation of my improved press with the turn-table shown in section. Fig. 2 is a plan view of the turn-table turned bottom upward, showing also the position of the stationary bar. Fig. 3 is a cross-section of the baling-box, taken on line 3 3 of Fig. 1. Fig. 4 is a detail view of the plunger, looking at the rear face, with the brace removed. Fig. 5 is a sectional view illustrating a modification.

The baling-box in which the bales are formed or pressed is indicated at A, and the horse-power by which the plunger B is operated is indicated at C, the two being connected by a beam D, of channel-iron. The baling-box is mounted upon the beam D at one end, as shown in Fig. 3, angle-irons $d$ being bolted to the channel-beam and forming an additional support for the baling-box. The box is composed of top and bottom metal plates E E and side plates F F of the same material connected by angle-irons G. The top and bottom plates are provided with three rows of perforations $e\ e\ e$, by means of which the angle-irons G may be bolted in any one of three positions, according to the width of bale desired, suitable bolts $e'$ being provided for securing the parts together.

The upper and lower angle-irons are preferably connected by means of vertical braces $G'$ and inclined braces $G^2$, bolted to the flanges of the angle-irons, and when the height of the box is to be varied for changing the height of the bale the vertical braces are replaced by longer or shorter ones, as the case may be, and the ends of the inclined braces are connected with different holes or openings $g$, provided for this purpose.

The side plates may either be bolted against the inner faces of the flanges in the manner shown in Fig. 3 or flush with the edges of the same, as shown in Fig. 5.

By using a single set of plates of the same size and bolting them in the manner shown in Fig. 3 when smaller bales are desired or in the manner shown in Fig. 5 when larger bales are desired it will be seen that two adjustments as to height may be secured with but a single set of side plates, as it will be observed that when bolted in the manner shown in Fig. 5 the flange of the angle-iron forms a continuation of the side plate, thus increasing the height of the press by the width of the flanges of the upper and lower angle-irons.

It will be observed that the side plates of the box are not extended to the extreme end and that cross-bars 1 are provided above and below, the ends of which are connected by rods 2, carrying adjusting-nuts 3, by means of which the end of the upper and lower sides of the box may be pressed together, so as to cause a resistance to the material in passing through this contracted space.

The baling-box, as before stated, is connected with the power by a channel-iron beam, and upon this beam is a channel-iron B, forming a plunger, which carries at one end a plunger-head I, while the other end carries a roller adapted to be operated upon by the power, as hereinafter described. The plunger-head I is suitably bolted and braced to the plunger and is provided with vertical slots $i$. Adjustable plates Q are provided having horizontally-arranged slots $q$. Bolts $i'$ are provided passing through the vertical and horizontal slots to secure the plates Q to the head I, and by means of these the plates may be adjusted vertically and laterally upon the plunger-head I to vary the size of the working face to correspond with the various adjustments of the box. It will be understood that when adjustment as to height is desired the plates Q are raised and any space left by so raising the plates which is not covered by the plunger-head will be so comparatively small as not to be material. Similarly, when the plates Q are adjusted laterally to correspond to increased width of the press a space will be left between the two plates, but that portion outside the plunger-head will be so small relative to the size of the plates as not not to be material.

The turn-table C is suitably journaled upon the beam D and carries one or more power-arms L for the attachment of the desired number of horses. Carried by the beam D is a stationary bar M, and to the under side of the turn-table, near the outer edge thereof, are pivoted one or more arms N, the opposite or free ends of the arms being provided with antifriction-rollers $n$, designed to come in contact with the stationary bar M. The roller $n'$ on the end of the plunger is arranged in line with the arms N, and it will be observed that as the turn-table rotates in the direction indicated by the arrow the roller $n$ on one of the pivoted arms will come in contact with the stationary bar M and the wedge-shaped end of the bar N will be pushed against or in rear of the roller $n'$ on the plunger. On the continued movement of the turn-table the movement of the arm N will cause the roller $n'$ and plunger to be pushed toward the baling-box, the roller $n$ and free end of the arm N riding along the surface of the stationary bar M and the roller $n'$ on the plunger riding along the surface of the arm N, thus securing a double cam action.

It will be noted that by varying the number of pivoted arms on the turn-table I can secure as many strokes to each rotation of the turn-table as desired.

The free ends of the pivoted arms are drawn inward by means of springs $m$ on the upper sides of the turn-table, each spring having one end connected to the turn-table and the other end connected to a bolt or projection extending upwardly from the arm through a curved slot $m'$ in the table.

Having thus described my invention, what I claim is—

1. In combination, the angle-irons, the top and bottom plates adjustably connected therewith, the side plates also adjustably connected with said angle-irons, the vertically and laterally extensible plunger-head and means for operating the same, substantially as described.

2. In combination, the corner angle-irons, the top and bottom plates bolted to the outer faces of the horizontal flanges thereof, the braces bolted to the outer faces of the vertical flanges and the side plates adapted to be bolted either to the inner faces of said vertical flanges or to the stays between said flanges to permit of the vertical enlargement of the press-box, substantially as described.

3. In a baling-press the combination with the plunger, of the turn-table, the stationary bar in proximity to the turn-table, and the arms pivoted to the turn-table and having their free ends adapted to contact with said bar, said arms being also adapted to contact with and move the plunger, substantially as described.

4. In combination, the support, the rotatable turn-table mounted thereon, the stationary incline or bar located in proximity to the turn-table, the arms pivoted to said table and having their inner ends adapted to contact with said stationary incline as the table rotates and the plunger having a roller in its end adapted to contact with said arm, substantially as described.

In testimony whereof I affix my signature in presence of two witnesses.

HENRY J. GRIMM.

Witnesses:
GERHARD G. ARENDS, Jr.,
WILLIAM T. GRIMM.